July 16, 1957   J. F. SCOTT   2,799,096
ONION DRYING APPARATUS AND METHOD
Filed July 13, 1955   2 Sheets-Sheet 1
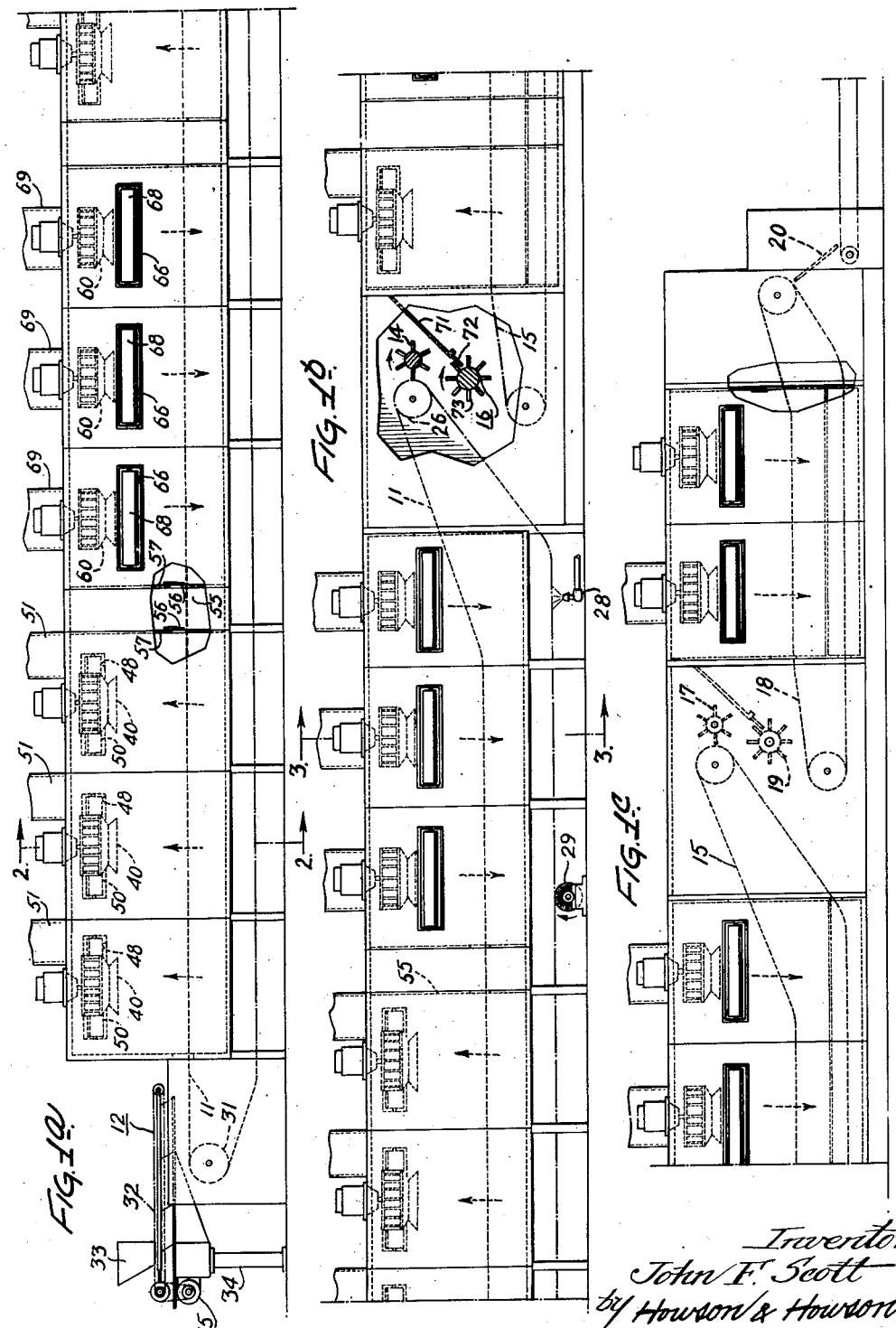

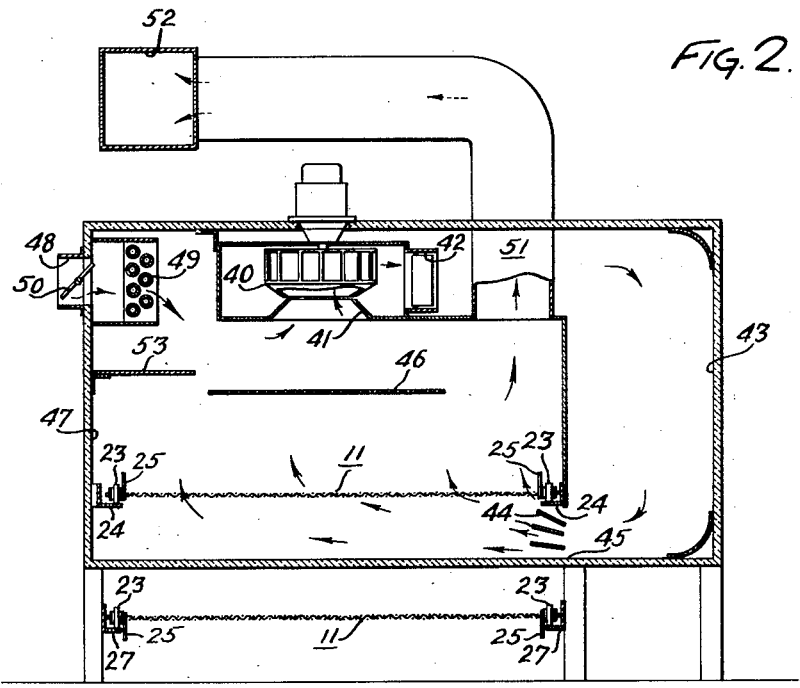
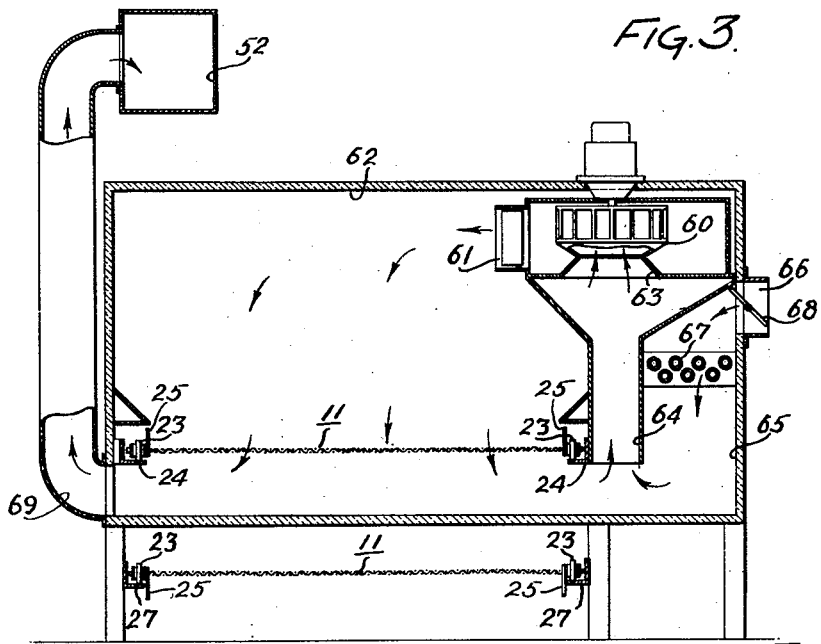

United States Patent Office 2,799,096
Patented July 16, 1957

2,799,096

ONION DRYING APPARATUS AND METHOD

John F. Scott, Oreland, Pa., assignor to Proctor & Schwartz, Inc., Philadelphia, Pa., a corporation of Pennsylvania Application July 13, 1955, Serial No. 521,698

16 Claims. (Cl. 34—31)

The present invention relates to apparatus and method for drying onions.

At the present time, there is a great demand for dried slices or broken slices of onions. The onion is served as slices, chips, or as ground onions, for use extensively in soups for flavor and seasoning. In addition it is often found expedient to dry the onions for storage which may then be used quickly for institutional feeding.

Prior to the present invention the sliced onions were loaded in trays which in turn were stacked on trucks or similar conveyors and moved slowly through a tunnel in which the air was circulated into contact with the onions. This method requires substantial manual handling of the onions in trays thereby causing high labor costs. In addition the quality of the dried onions is not the best because the drying rate is relatively slow as the trays of onions are advanced through the tunnel. In addition, the onions tend to stick to the trays, and since they are loaded only to a depth of 1 or 1½ inches the percentage loss per tray is high.

The present invention materially reduces the handling, and therefore the labor costs; reduces the loss due to sticking to a minimum; and increases the quality of the finished product by effecting more rapid drying by means of better circulation of the drying medium.

More particularly, the present invention provides a method for drying onions and the like in which the air is circulated alternately upwardly and downwardly through a layer of the material.

Another object of the present invention is to provide a method for drying onions and the like which affords the use of lower temperatures in the final stages of the drying operation, thereby producing a better quality of product than heretofore possible.

Still another object of the present invention is to provide apparatus having improved structural characteristics, and which is fully effective in operation and use.

These and other objects of the invention, and the various features and details of the construction and operation thereof are more fully set forth hereinafter with reference to the accompanying drawings, in which:

Figs. 1a, 1b and 1c, when placed end to end from left to right in the order given, make up a side elevational view of a dryer made in accordance with the present invention;

Fig. 2 is an enlarged sectional view taken on the line 2—2 of Fig. 1a; and

Fig. 3 is an enlarged sectional view taken on the line 3—3 of Fig. 1b.

In accordance with the invention the onions are advanced through three stages of a dryer. To this end the onions are loaded on a first conveyor 11 by a loading mechanism indicated at 12 in Fig. 1a. The first conveyor carries the onions through the first stage of the dryer which consists of a plurality of compartments in which the air circulation alternates successively from upward circulation to downward circulation normal to said conveyor. Preferably the onions are disposed on the conveyor to a depth of 2½ to 4½ inches. Throughout the first stage temperature is maintained at a predetermined level, in accordance with the conditions of the onions being dried. Ordinarily, this temperature ranges between 140 and 178° F.

At the end of the first stage, the onions are stripped from the conveyor by means of a doffer 14 and are deposited onto a second conveyor 15 by means of a breaker 16 which breaks apart the onion pieces which have become adhered or matted together. The conveyor 15 moves slower than the conveyor 11, so that the onion pieces are deposited on the conveyor to a greater depth than on the first conveyor, preferably between 3 and 6 inches.

The second conveyor 15 carries the onions through the second stage of the dryer which is maintained at a temperature level preferably between 130° and 145° F. Whereas in the first stage the onion pieces are dried to about 45–55% BDB, the second stage of the dryer effects drying to about 20–25% BDB, where BDB means "bone-dry-basis" which indicates the weight of moisture as a percentage of the weight of bone-dry solid.

At the end of the second stage the onion pieces are stripped from the conveyor 15 by means of a doffer 17, and are deposited on a third conveyor 18 by means of a breaker 19. The third conveyor moves slower than the second conveyor so that the onion pieces are deposited to a greater depth than on the second conveyor. Preferably the depth ranges between 6 and 12 inches. The third stage of the dryer is maintained at a predetermined temperature level, preferably between 120° and 130° F., so that when the onion pieces are discharged, as indicated at 20, their moisture content is between 8% and 15% BDB.

Referring now to the details of the construction of the apparatus, the conveyor 11 comprises a foraminous belt or screen which, as shown in Fig. 2, extends across the full width of the drying chamber. The screen is mounted on rollers 23, which are guided in their passage through the first stage of the dryer on the tracks 24, 24. A guard 25 is positioned at each side of the screen to maintain the onion pieces on the screen and prevent their fouling in the tracks 24, 24. The tracks 24 are substantially horizontal throughout the first stage of the dryer, and in the last section of the stage slope upwardly to direct the screen 11 around a pulley 26 and into contact with the doffer 14. The return run of the conveyor 11 is supported on tracks 27, 27 below the floor of the dryer, and means is provided at 28 and 29 to remove any onion pieces which may not have been stripped from the conveyor 11 by the doffer 14. In the present instance the stripping mechanism comprises a spray at 28 and a brush at 29. At the load end of the machine the return run of the conveyor is trained around a pulley 31 to direct the conveyor onto the tracks 24, 24.

To insure uniform loading of the conveyor the loading unit 12 comprises a relatively narrow feeder 32 which is fed by a hopper 33. The feeder 32 is mounted on a pedestal 34 and is swept transversely of the conveyor 11 by mechanism indicated generally at 35. Thus a uniform layer of onions is deposited across the full width of the conveyor 11.

As the onion pieces are advanced through the first stage on the conveyor 11 they are subjected alternately to upcurrents and downcurrents of air normal to the layer of onion pieces on the conveyor. The first stage is divided into a plurality, in the present instance four, sections. As shown in Fig. 2, in the first section air passes upwardly through the conveyor 11. To this end, a plurality of blowers 40 are positioned centrally in the housing of the first section having their inlet open to the interior of the casing as indicated at 41. The blower is of centrifugal type and operates to discharge the air through an outlet port 42 into the forward chamber 43 of the dryer. From the chamber 43, the air is sucked through the conveyor 11 by the blower, distribution of the air under the complete surface of the conveyor being insured by vanes 44 in the exhaust opening 45 of the forward chamber 43.

Means is provided to further insure proper distribution of the air through the conveyor 11 in the form of a perforated baffle plate 46 suspended in the main dryer chamber 47 below the inlet 41 of the blower and in spaced parallel relation above the conveyor 11. A fresh air inlet 48 is provided at the rear of the main chamber 47 to supplement the recirculating air. The incoming air is heated by a finned pipe or other heater 49, and the quantity of air is regulated by a damper blade 50 positioned in the inlet opening 48.

The heated incoming fresh air replaces a portion of the recirculating air which is discharged through a stack 51 to a discharge conduit 52 positioned above the dryer housing.

The incoming fresh air which is heated by the heater 49, is regulated to maintain the temperature within the drying chamber at the desired level, preferably between 140° and 178° F. depending upon the condition of the onions being dried. This makes up for the heat lost to the surroundings by radiation and conduction so that the temperature within the drying chamber 47 is maintained relatively constant. The blower circulates the air with a velocity of between 250 and 275 ft. per minute through the conveyor, so that the moisture in the onions entering the first section of the first stage of the dryer (which is ordinarily approximately 685% BDB) is substantially reduced. As shown in Fig. 2, a baffle 53 is provided below the air inlet 48 to deflect the incoming fresh heated air away from the conveyor 11 whereby it is thoroughly mixed with the recirculating air prior to contacting the onions on the conveyor.

In the second section of the first stage of the dryer, the onion pieces on the conveyor 11 are subjected to a down current of air. To isolate the first from the second section, a vestibule 55 is provided therebetween. The vestibule forms a dead air space between the two sections, so that there is little tendency for the air from one section to pass into the adjacent section.

To further increase the efficiency of the vestibule, adjustable baffles 56, 56 are provided on the partitions 57, 57 terminating the sections. The baffles 56 partially close the openings in the partitions to reduce the opening to the minimum required for passage of the conveyor and onions therethrough. The baffles 56, 56 are adjusted to as close to the height of the bed of material on the conveyor as possible. A similar vestibule is positioned between the second and third section, and between the third and fourth section. These vestibules are similar to the above described vestibules and will not be described in detail herein.

As pointed out above, the third section of the first stage is identical to the first section to provide an upcurrent of air through the material on the conveyor 11. Likewise, the fourth section of the conveyor is constructed identically to the second section to provide a downcurrent of air through the material on the conveyor.

As shown in Fig. 3, the sections providing a downcurrent of air are provided with a series of blowers 60. The outlet 61 of the blower casing is directed into the main dryer housing 62, whereas the inlet 63 is connected to a vertical duct 64 positioned intermediate the main chamber 62 and a forward chamber 65 and open at its lower end below the level of the conveyor 11. Thus the blower 60 provides a circulation of air into the main chamber 62 downwardly through the conveyor 11 and upwardly through the duct 64.

A fresh air inlet 66 opens into the forward chamber 65 through a finned pipe or other heater 67. A baffle is provided at 68 to regulate the flow of fresh air into the casing. Thus as with the sections providing an upcurrent of air, the second and fourth sections are provided with a fresh air inlet to supplement the recirculating air. The portion of the recirculating air which is replaced by the fresh air is discharged through a stack 69 into the exhaust conduit 52. By regulating the heated fresh air which is introduced into the drying chamber, the temperature of the drying chamber is maintained at the desired level.

Thus throughout the first stage of the dryer, the temperature is maintained at a predetermined level, and the air is circulated through the conveyor 11 at a rate of between 250 and 275 feet per minute. In the first and third sections the air is directed upwardly through the conveyor, and in the second and fourth sections the air is directed downwardly therethrough. In this manner the material on the conveyor is subjected alternately to upcurrents and downcurrents, of the drying medium, thereby providing thorough drying of the material uniformly throughout the mass thereof. The moisture content of the material leaving the first stage of the dryer is normally between 45% and 55% BDB.

As described above at the end of the first stage of the dryer the pieces of onion or other material are stripped from the conveyor 11 by a doffer 14. The doffer 14 impinges the material against a chute 71 which terminates at its lower end with a series of outwardly projecting pins 72. A pin roll 73 cooperates with the pins 72 to form a breaker for breaking up the pieces of onion or other material which have become adhered or matted together during the first stage of the drying operation. The action of the beater deposits the material on the conveyor 15 as described above in a relatively thick layer. The material deposited on the conveyor 15 has new surfaces exposed to the drying medium, thereby insuring more uniform drying throughout the layer in the second stage.

In the second stage, the material on the conveyor 15 is subjected alternately to an upcurrent and a downcurrent of air in successive sections. The first section is similar to the first and third sections of the first stage, but is shorter in length. The second and last section is similar to the second and fourth sections of the first stage, but also shorter in length. The two sections of the second stage are separated by a vestibule similar to the vestibule 55 to isolate the section providing upcurrent from the section providing downcurrents.

As in the first stage the temperature in the sections is regulated by regulation of the incoming heated fresh air. Throughout the second stage the temperature is maintained at a predetermined level between 130° F. and 145° F., depending on the moisture content of the material and the quality of the finished product desired.

A higher temperature, affords a more rapid drying, but a lower temperature provides improved quality in the finished product. As in the first stage the velocity of the air passing through the conveyor 15 is substantially the same as the velocity in the first stage, namely, 250 to 275 feet per minute. At the end of the second stage of the dryer, the moisture content of the material is between 20% and 25% BDB.

After passing through the second stage, the material is doffed from the second conveyor 15 and deposited on the third conveyor 18 by the doffer and breaker 17 and 19 respectively. As pointed out above the conveyor 18 has a slower linear speed than the conveyor 15, so that a layer of substantial thickness is deposited on the conveyor 18.

The third stage of the dryer comprises a single section. In the illustrated embodiment, the air is directed downwardly through the conveyor 18, but it may be found preferable in some installations to provide an upcurrent of air in the third stage. In either event the construction of the section is identical to the construction of the sections described above.

The temperature in the third stage is regulated by regulating the incoming heated fresh air inlet to a predetermined level, preferably between 120° F. and 130° F. The slow speed of the conveyor maintains the material in the third stage between 1 and 2 hours, so that at the discharge end of the dryer the moisture content of the material is between 8% and 15% BDB.

Thus the present invention provides a dryer having three stages. In the first stage the material is treated between 1 and 1½ hours at a temperature between 140 and 178° F. with alternating upcurrents and downcurrents of air at a velocity of between 250 and 275 feet per minute. In the second stage the material is treated for between 20 and 40 minutes with alternating up and down currents of air at between 130 and 145° F. having a velocity of 250 to 275 feet per minute. In the third stage the material is treated for from 1 to 2 hours at between 120° F. and 130° F. with an air circulation velocity of 250 feet per minute in one direction normal to the conveyor. This provides a highly efficient dryer which insures uniform drying of the material in a relatively short period of time and in a relatively small space.

While a particular embodiment of the present invention has been herein illustrated and described, it is not intended to limit the invention to such a disclosure, but changes and modifications may be made therein and thereto within the scope of the following claims.

I claim:

1. In the method of drying onion slices and like materials, the steps which comprise disposing the material in a layer of uniform thickness, passing heated gaseous drying medium through said layer alternately in opposite directions normal to said layer to partially dry the material to a moisture content of between 45 and 55 percent BDB, rearranging said material in a second layer of uniform thickness, passing heated gaseous drying medium through said material alternately in opposite directions normal to said second layer to further dry the material to a moisture content of between 20 and 55 percent BDB, rearranging said material in a third layer of uniform thickness, and passing heated gaseous drying medium through said material in a direction normal to said third layer to dry the material to a moisture content of between 8 and 15 percent BDB.

2. In the method of drying onion slices and like materials, the steps which comprise disposing the material in a layer of uniform thickness, passing heated gaseous drying medium through said layer alternately in opposite directions normal to said layer, rearranging said material in a second layer of uniform thickness greater in depth than said first layer, passing heated gaseous drying medium of lower temperature than said first mentioned medium through said material alternately in opposite directions normal to said second layer, rearranging said material in a third layer of uniform thickness greater in depth than said first and second layers, and passing heated gaseous drying medium of lower temperature than the aforementioned temperatures through said material in a direction normal to said layer to dry the material.

3. In the method of drying onion slices and like materials, the steps which comprise disposing the material in a layer of substantially uniform thickness of a selected depth, passing a heated gaseous drying medium at a temperature between 140° F. and 178° F., through said layer alternately in opposite directions normal to said layer, rearranging said material in a second layer of substantially uniform thickness greater in depth than said first layer, passing a heated gaseous drying medium at a temperature between 130° F. and 145° F. through said material in the second layer alternately in opposite directions normal to said layer, rearranging said material in a third layer of substantially uniform thickness greater in depth than said first and second layers, and passing heated gaseous drying medium at a temperature between 120° F. and 130° F. through said material in the third zone in a direction normal to said third layer to dry the same.

4. In the method of drying onion slices and like materials, the steps which comprise disposing the material in a layer of substantially uniform thickness of a selected depth, continuously advancing said layer through a drying zone, passing a heated gaseous drying medium at a temperature between 140° F. and 178° F., through said layer alternately in opposite directions normal to said layer in said drying zone, rearranging said material in a second layer of substantially uniform thickness greater in depth than said first layer, continuously advancing said second layer through a second drying zone, passing a heated gaseous drying medium at a temperature between 130° F. and 145° F. through said material in the second zone alternately in opposite directions normal to said layer, rearranging said material in a third layer of substantially uniform thickness greater in depth than said first and second layers, continuously advancing said third layer through a third drying zone, and passing heated gaseous drying medium at a temperature between 120° F. and 130° F. through said material in the third zone in a direction normal to said layer to dry the same.

5. In the method of drying onion slices and like materials, the steps which comprise disposing the material in a layer of substantially uniform thickness of a selected depth, continuously advancing said layer through a drying zone, passing a heated gaseous drying medium at a temperature between 140° F. and 178° F., through said layer alternately in opposite directions normal to said layer in said drying zone, breaking up the partially dried material into relatively small pieces, and rearranging said material in a second layer of substantially uniform thickness greater in depth than said first layer, continuously advancing said second layer through a second drying zone, passing a heated gaseous drying medium at a temperature between 130° F. and 145° F. through said material in the second zone alternately in opposite directions normal to said layer, breaking up the partially dried material into relatively small pieces and rearranging said material in a third layer of substantially uniform thickness greater in depth than said first and second layers, continuously advancing said third layer through a third drying zone, and passing heated gaseous drying medium at a temperature between 120° F. and 130° F. through said material in the third zone in a direction normal to said layer to dry the same.

6. In the method of drying onion slices and like materials, the steps which comprise disposing the material in a layer of substantially uniform thickness of a selected depth, continuously advancing said layer through a drying zone, passing a heated gaseous drying medium at a temperature between 140° F. and 178° F., through said layer alternately in opposite directions normal to said layer in said drying zone at a selected velocity, breaking up the partially dried material into relatively small pieces, and rearranging said material in a second layer of substantially uniform thickness greater in depth than said first layer, continuously advancing said second layer through a second drying zone, passing a heated gaseous drying medium at a temperature between 130° F. and 145° F. through said material in the second zone alternately in opposite directions normal to said layer at a selected velocity, breaking up the partially dried material into relatively small pieces and rearranging said material in a third layer of substantially uniform thickness greater in depth than said first and second layers, continuously advancing said third layer through a third drying zone, and passing heated gaseous drying medium at a temperature between 120° F. and 130° through said material in the third zone in a direction normal to said layer at a selected velocity to dry the same.

7. In the method of drying onion slices and like materials, the steps which comprise disposing the material in a layer of substantially uniform thickness of a selected depth, continuously advancing said layer through a drying zone, passing a heated gaseous drying medium at a temperature between 140° F. and 178° F., through said layer alternately in opposite directions normal to said layer in said drying zone at a selected velocity for a given period of time, breaking up the partially dried material into relatively small pieces, and rearranging said material in a second layer of substantially uniform thickness greater in depth than said first layer, continuously advancing said second layer through a second drying zone, passing a heated gaseous drying medium at a temperature between 130° F. and 145° F. through said material in the second zone alternately in opposite directions normal to said layer at a selected velocity for a given period of time, breaking up the partially dried material into relatively small pieces and rearranging said material in a third layer of substantially uniform thickness greater in depth than said first and second layers, continuously advancing said third layer through a third drying zone, and passing heated gaseous drying medium at a temperature between 120° F. and 130° F. through said material in the third zone in a direction normal to said layer at a selected velocity for a given period of time to dry the same.

8. In the method of drying onion slices and like materials, the steps which comprise disposing the material in a layer of substantially uniform thickness of a selected depth, passing a heated gaseous drying medium at a temperature between 140° F. and 178° F., through said layer alternately in opposite directions normal to said layer at a velocity of between 250 and 275 feet per minute, rearranging said material in a second layer of substantially uniform thickness greater in depth than said first layer, passing a heated gaseous drying medium at a temperature between 130° F. and 145° F. through said material in the second layer alternately in opposite directions normal to said layer at a velocity between 250 and 275 feet per minute, rearranging said material in a third layer of substantially uniform thickness greater in depth than said first and second layers, and passing heated gaseous drying medium at a temperature between 120° F. and 130° F. through said material in the third layer in a direction normal to said layer at a velocity between 250 and 275 feet per minute to dry the same.

9. In the method of drying onion slices and like materials, the steps which comprise disposing the material in a layer of substantially uniform thickness of a selected depth, passing a heated gaseous drying medium at a temperature between 140° F. and 178° F., through said layer alternately in opposite directions normal to said layer for a period of between 1 and 1½ hours, rearranging said material in a second layer of substantially uniform thickness greater in depth than said first layer, passing a heated gaseous drying medium at a temperature between 130° F. and 145° F. through said material in the second layer alternately in opposite directions normal to said layer for a period between 20 and 40 minutes, rearranging said material in a third layer of substantially uniform thickness greater in depth than said first and second layers, and passing heated gaseous drying medium at a temperature between 120° F. and 130° F. through said material in the third layer in a direction normal to said layer for a period of between 1 and 2 hours to dry the same.

10. In the method of drying onion slices and like materials, the steps which comprise disposing the material in a layer of substantially uniform thickness of a selected depth, passing a heated gaseous drying medium at a temperature between 140° F. and 178° F., through said layer alternately in opposite directions normal to said layer at a velocity of between 250 and 275 feet per minute for a period of time between 1 and 1½ hours, rearranging said material in a second layer of substantially uniform thickness greater in depth than said first layer, passing a heated gaseous drying medium at a temperature between 130° F. and 145° F. through said material in the second layer alternately in opposite directions normal to said layer at a velocity between 250 and 275 feet per minute for a period between 20 and 40 minutes, rearranging said material in a third layer of substantially uniform thickness greater in depth than said first and second layers, and passing heated gaseous drying medium at a temperature between 120° F. and 130° F. through said material in the third layer in a direction normal to said layer at a velocity between 250 and 275 feet per minute for a period of between 1 and 2 hours to dry the same.

11. In the method of drying onion slices and like materials, the steps which comprise disposing the material in a layer of substantially uniform thickness of a selected depth, continuously advancing said layer through a drying zone, passing a heated gaseous drying medium at a temperature between 140° F. and 178° F., through said layer alternately in opposite directions normal to said layer in said drying zone at a velocity of between 250 and 275 feet per minute, breaking up the partially dried material into relatively small pieces and rearranging said material in a second layer of substantially uniform thickness greater in depth than said first layer, continuously advancing said second layer through a second drying zone, passing a heated gaseous drying medium at a temperature between 130° F. and 145° F. through said material in the second zone alternately in opposite directions normal to said layer at a velocity between 250 and 275 feet per minute, breaking up the partially dried material into relatively small pieces and rearranging said material in a third layer of substantially uniform thickness greater in depth than said first and second layers, continuously advancing said third layer through a third drying zone, and passing heated gaseous drying medium at a temperature between 120° F. and 130° F. through said material in the third zone in a direction normal to said layer at a velocity between 250 and 275 feet per minute to dry the same.

12. In the method of drying onion slices and like materials, the steps which comprise disposing the material in a layer of substantially uniform thickness of a selected depth, continuously advancing said layer through a drying zone, passing a heated gaseous drying medium at a temperature between 140° F. and 178° F., through said layer alternately in opposite directions normal to said layer in said drying zone for a period of between 1 and 1½ hours, breaking up the partially dried material into relatively small pieces and rearranging said material in a second layer of substantially uniform thickness greater in depth than said first layer, continuously advancing said second layer through a second drying zone, passing a heated gaseous drying medium at a temperature between 130° F. and 145° F. through said material in the second zone alternately in opposite directions normal to said layer for a period between 20 and 40 minutes, breaking up the partially dried material into relatively small pieces and rearranging said material in a third layer of substantially uniform thickness greater in depth than said first and second layers, continuously advancing said third layer through a third drying zone, and passing heated gaseous drying medium at a temperature between 120° F. and 130° F. through said material in the third zone in a direction normal to said layer for a period of between 1 and 2 hours to dry the same.

13. In the method of drying onion slices and like materials, the steps which comprise disposing the material in a layer of substantially uniform thickness of a selected depth, continuously advancing said layer through a drying zone, passing a heated gaseous drying medium at a temperature between 140° F. and 178° F., through said layer alternately in opposite directions normal to said layer in said drying zone at a velocity of between 250 and 275 feet per minute for a period of between 1 and 1½ hours, breaking up the partially dried material into relatively small pieces and rearranging said material in a second layer of substantially uniform thickness greater in depth than said first layer, continuously advancing said second layer through a second drying zone, passing a heated gaseous drying medium at a temperature between 130° F. and 145° F. (at lower temperature than the first mentioned medium) through said material in the second zone alternately in opposite directions normal to said layer at a velocity between 250 and 275 feet per minute for a period between 20 and 40 minutes, breaking up the partially dried material into relatively small pieces and rearranging said material in a third layer of substantially uniform thickness greater in depth than said first and second layers, continuously advancing said third layer through a third drying zone, and passing heated gaseous drying medium at a temperature between 120° F. and 130° F. through said material in the third zone in a direction normal to said layer at a velocity between 250 and 275 feet per minute for a period of between 1 and 2 hours to dry the same.

14. In the method of drying onion slices and like materials, the steps which comprise disposing the material in a layer of substantially uniform thickness of a selected depth, continuously advancing said layer through a drying zone, passing a heated gaseous drying medium through said layer alternately in opposite directions normal to said layer in said drying zone at a velocity of between 250 and 275 feet per minute for a period of between 1 and 1½ hours, breaking up the partially dried material into relatively small pieces and rearranging said material in a second layer of substantially uniform thickness greater in depth than said first layer, continuously advancing said second layer through a second drying zone, passing a heated gaseous drying medium at lower temperature than the first mentioned medium through said material in the second zone alternately in opposite directions normal to said layer at a velocity between 250 and 275 feet per minute for a period between 20 and 40 minutes, breaking up the partially dried material into relatively small pieces and rearranging said material in a third layer of substantially uniform thickness greater in depth than said first and second layers, continuously advancing said third layer through a third drying zone, and passing heated gaseous drying medium at lower temperature than the aforementioned temperatures through said material in the third zone in a direction normal to said layer at a velocity between 250 and 275 feet per minute for a period of between 1 and 2 hours to dry the same.

15. Apparatus for drying onion slices and like materials comprising a first foraminous conveyor, means to advance said first conveyor at a given rate, means for distributing the material upon said conveyor in a uniform layer of selected thickness, a first dryer stage surrounding said first conveyor comprising a plurality of sections, means to condition and circulate a gaseous drying medium through the layer of material in each section with the medium passing alternately in opposite directions normal to said conveyor in successively adjacent sections, a second foraminous conveyor adjacent the discharge end of said first conveyor, means intermediate said first and second conveyors for stripping said first conveyor, breaking up the material into relatively small pieces, and distributing the same upon said second conveyor in a uniform layer, means to advance said second conveyor at a slower rate than said first conveyor, a second dryer stage surrounding said second conveyor comprising a plurality of sections, means to condition and circulate gaseous drying medium through the layer of material in each section with the medium passing alternately in opposite directions normal to said conveyor in successively adjacent sections, a third foraminous conveyor adjacent the discharge end of said second conveyor, means intermediate said second and third conveyors for stripping said second conveyor, breaking up the material into relatively small pieces, and distributing the material upon said third conveyor in a uniform layer of selected thickness, means to advance said third conveyor at a rate lower than said second conveyor, a third dryer stage surrounding said third conveyor comprising at least one section, and means to condition and circulate a gaseous drying medium through the layer of material in said section with the medium passing in a direction normal to said conveyor, and means adjacent the discharge end of said third conveyor for collecting the dried material therefrom.

16. Apparatus for drying onion slices and like materials comprising a first foraminous conveyor, means to advance said first conveyor at a given rate, means for distributing the material upon said conveyor in a uniform layer of selected thickness, a first dryer stage surrounding said first conveyor comprising a plurality of sections, means defining a dead air space between adjacent sections, means to condition and circulate a gaseous drying medium through the layer of material in each section with the medium passing alternately in opposite directions normal to said conveyor in successively adjacent section; a second foraminous conveyor adjacent the discharge end of said first conveyor, means intermediate said first and second conveyors for stripping said first conveyor, breaking up the material into relatively small pieces, and distributing the same upon said second conveyor in a uniform layer, means to advance said second conveyor at a slower rate than said first conveyor, a second dryer stage surrounding said second conveyor comprising a plurality of sections, means defining a dead air space between adjacent sections, means to condition and circulate gaseous drying medium through the layer of material in each section with the medium passing alternately in opposite directions normal to said conveyor in successively adjacent sections; a third forminous conveyor adjacent the discharge end of said second conveyor, means intermediate said second and third conveyors for stripping said second conveyor, breaking up the material into relatively small pieces, and distributing the material upon said third conveyor in a uniform layer of selected thickness, means to advance said third conveyor at a rate lower than said second conveyor, a third dryer stage surrounding said third conveyor comprising at least one section, and means to condition and circulate a gaseous drying medium through the layer of material in said section with the medium passing in a direction normal to said conveyor; and means adjacent the discharge end of said third conveyor for collecting the dried material therefrom.

References Cited in the file of this patent

UNITED STATES PATENTS

| Number | Name | Date |
|---|---|---|
| 1,915,648 | De Reamer | June 27, 1933 |
| 2,406,431 | Miller | Aug. 27, 1946 |
| 2,419,876 | Birdseye | Apr. 29, 1947 |
| 2,502,134 | Erickson | Mar. 28, 1950 |
| 2,523,552 | Birdseye | Sept. 26, 1950 |
| 2,541,859 | Callaghan et al. | Feb. 13, 1951 |